Patented Jan. 10, 1933

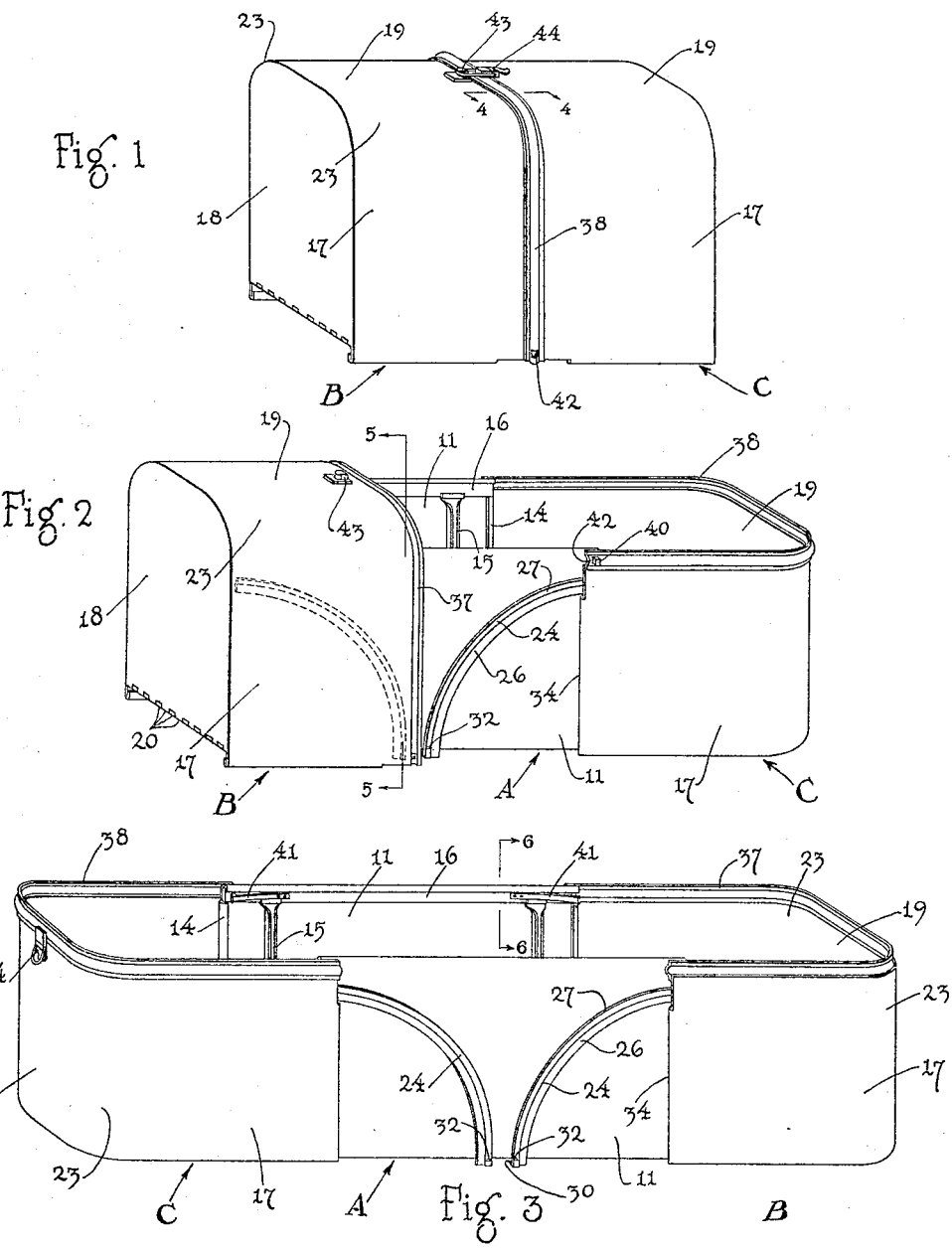

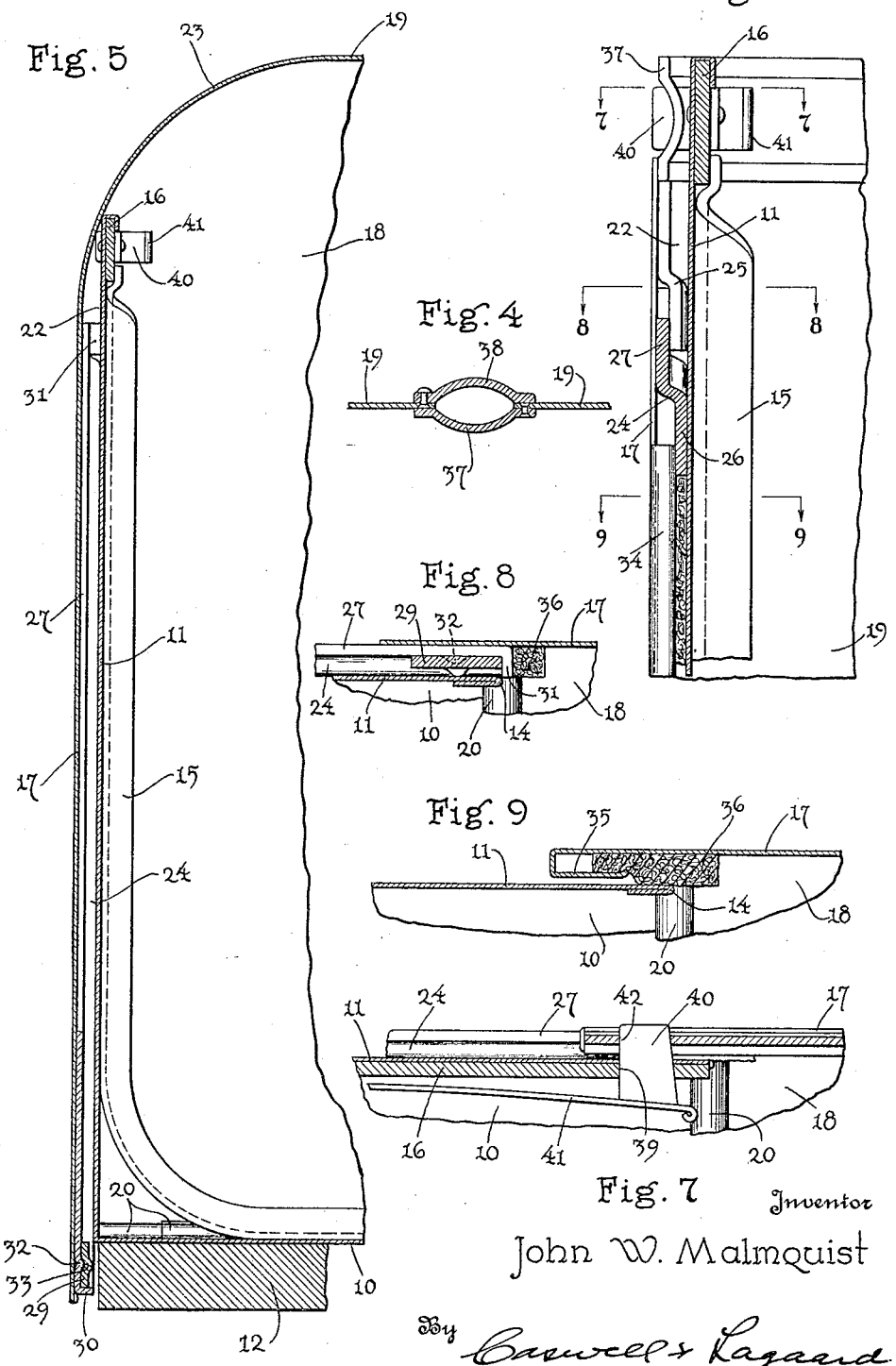

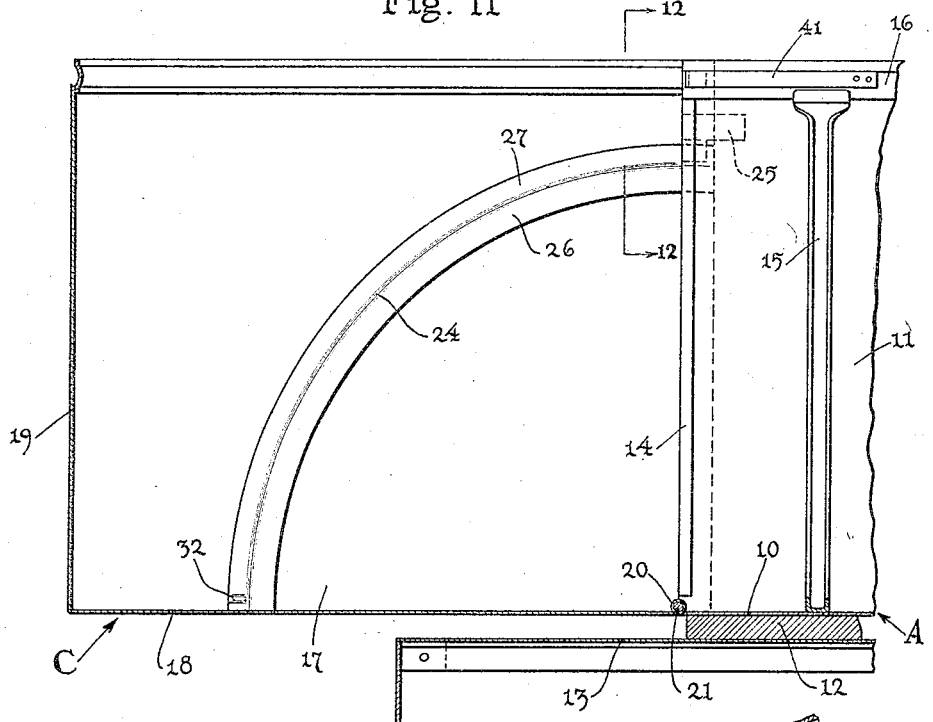
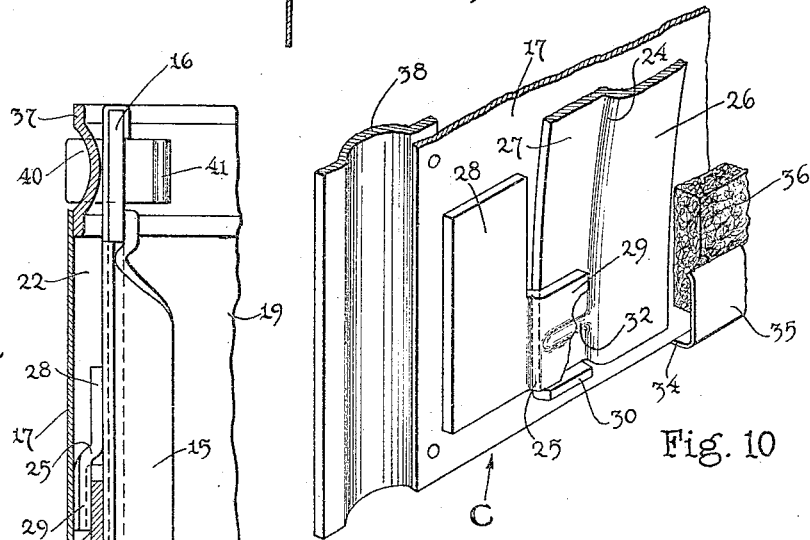

1,893,751

UNITED STATES PATENT OFFICE

JOHN W. MALMQUIST, OF ABERDEEN, SOUTH DAKOTA

COMBINED TRUNK AND LUGGAGE CARRIER FOR AUTOMOBILES

Application filed October 13, 1930. Serial No. 488,386.

My invention relates to improvements in combined trunks and luggage carriers for automobiles and particularly to improvements in the type of device disclosed in my co-pending application, Ser. No. 364,066.

Shown in that application is a combined trunk and luggage carrier, constructed to be supported extending crosswise of an automobile body at the rear thereof and capable of being extended and contracted endwise in a direction transversely of the supporting automobile, said structure comprising an intermediate or body section adapted to rest upon the support for the device, or be secured to the support for the device, and further comprising end or wing sections hinged to the body section and adapted, in folded position, to envelope the body section in marginally overlapping relation to form a closed trunk and, in unfolded position, to provide terminal extensions for the body section cooperating therewith to form an elongated open top carrier. In the device thus disclosed in said application, the intermediate section includes sides and a bottom, while each of the end sections includes sides and two walls. In folded position, the sides of the wing sections, overlap the sides of the body section, and the walls thereof close the open top and ends of said body section, while in the unfolded positions of the wing sections, wherein they serve as extensions to the body section, the sides provide continuations of the sides of the body section, and the walls form end and bottom members in the elongated open top structure.

I have embodied in the structure above outlined, certain structural features which enhance the practicability thereof in general used and which render the structure capable of efficient and economical production.

An object of my present invention is to provide in a combined trunk and luggage carrier of the character noted, simple and efficient features of construction, which minimize costs and provide for strength in the individual sections and in the composite structure and which render the device noiseless, sightly and weather proof and which make for ease and convenience in the use of the convertible structure.

More particularly, it is an object of my present invention to provide sliding connections between the intermediate and wing sections to cause the same to cooperate and reinforce each other in the different relative positions thereof.

Another object of the invention is to provide a non-rattling construction, wherein a squeezing effect is produced between the intermediate section and wing sections in the folded positions of the latter and wherein the said sliding connections between the sections contribute in producing the squeezing effect and also serve to minimize the distortion of parts.

A further object of the invention is to incorporate in the sliding connections, between the different sections, means for limiting the unfolding movements of the wing sections and for bracing the same against the weight of loads in their extended positions.

An additional feature of the invention resides in providing ribs or beads for reinforcing the wing sections at the marginal portions thereof which overlap in the folded positions of said sections, which ribs enhance the appearance of the device and cooperate to exclude the entrance of water thereto in the compacted trunk-like form thereof.

Another object of the invention is to provide simple and effective locking devices for automatically latching the wing sections in their unfolded or extended positions, such devices being inconspicuously, though conveniently, arranged and constructed to take up wear, thereby preserving the desired rigid relation of parts and preventing rattling.

With the foregoing and other objects in view, which will appear in the following description, the invention resides in the novel combination and arrangement of parts and in the details of construction hereinafter described and claimed.

In the drawings:

Figs. 1, 2 and 3 are perspective views of a combined trunk and luggage carrier embodying my invention, Fig. 1 showing the device in its trunk-like form with both wing sections folded, Fig. 2 showing one wing section unfolded and Fig. 3 showing the device in its form as an open top carrier, both wing sections being unfolded; Fig. 4 is a sectional view taken as on the line 4—4 of Fig. 1, particularly illustrating a bead construction incorporated in the marginal portions of the wing sections, which overlap when said sections are folded on the intermediate section; Fig. 5 is a sectional view taken as on the line 5—5 of Fig. 2 illustrating the relation of parts, wherein the anti-rattling squeezing effect is produced between the wing sections and body section and wherein the sliding connections between said sections contribute to the squeezing effect and operate to prevent the spreading of the sides of the wing sections from the sides of the body section; Fig. 6 is an enlarged sectional view in detail, taken as on the line 6—6 of Fig. 3, illustrating the locking device for the wing section shown, also a form of sliding connection between adjacent sides of the body section and said wing section and, further, the sealing strip employed between said adjacent sides; Figs. 7, 8 and 9 are detail sectional views taken as on the lines 7—7, 8—8 and 9—9 of Fig. 6, respectively, Fig. 7 showing particularly the locking device, Fig. 8, the sliding connection and the stop which limits the relative movement of its members, and Fig. 9, the sealing strip; Fig. 10 is a perspective view in detail of a corner portion of one of the sides of a wing section and of a portion of the guide rail which is secured to the adjacent side of the body section, said view particularly illustrating the construction of said guide rail and the companion shoe on the wing section which cooperates therewith, and Figs. 11 and 12 are views illustrating an alternate disposition of guide rails and shoes constituting the sliding connections between the body and wing sections, Fig. 11 being a fragmentary longitudinal sectional view taken vertically through an open wing section and the adjoining portion of the body section and Fig. 12 being a sectional view taken on the line 12—12 of Fig. 11.

Referring now to the drawings, it will be noted that the illustrated embodiment of my invention includes an intermediate or body section A and end or wing sections B, C.

The body section A includes a bottom 10 and sides 11, said section being open at the ends and top thereof. The bottom 10 rests upon a block 12 which is supported upon and secured to a rack 13 or other suitable support. The sides 11 are strengthened at their ends by turning the marginal portions thereof inwardly upon themselves as at 14. In further strengthening the body section A, I employ a pair of U-shaped braces 15 of channel iron, the flanges thereof being turned inwardly. These braces 15 fit within the body section A transversely thereof in spaced relation, the bases of said braces being secured to the bottom 10 and the legs thereof being secured to the sides 11. The upper ends of the legs of the braces 15 are flattened out and at each side of the body section A are welded or otherwise suitably secured to a reinforcing bar 16 over the upper edge of which is turned the upper margin of the adjacent side 11.

The end or wing sections B, C are, in the main, identical, each including sides 17 and walls 18 and 19, and, in form, being comparable to a box open at the top and one end. These wing sections B, C are hinged to the body section at the opposite ends thereof, the wall 18 of each and the bottom 10 of the body section A having inter-disposed inturned extensions 20 formed to receive a hinge pin 21 (Fig. 11).

The wing sections B, C envelop the body section A in their folded positions, each forming a hood closing one open end and a portion of the open top of the body section and thus resolving the device into the form of a closed trunk, while said sections B, C, in their unfolded positions form terminal extensions for said body section A resolving the structure into the form of an open top carrier. With the wing sections folded, the sides 17 thereof lap the sides 11 of the body section A, a space, as at 22, being left between the adjacent sides for guide rails and shoes, as will more fully hereinafter appear. In such folded positions of the wing sections B, C, the walls 19 thereof form top or cover portions for the closed structure, while the walls 18 form ends therefor. In the unfolded positions of the wing sections B, C the sides 17 thereof marginally lap the end margins of the sides 11 of the body section A, said sides 11, 17 being substantially in continuation of each other, the wall 18 of each section B, C forming a bottom portion in the extended structure and the wall 19 forming an end thereof.

The sides 17 of each of the wing sections B, C merge with the wall 19 thereof in curved corner portions 23, the inner surfaces of which engage the upper edges of the sides 11 of the body section A in the folded positions of said wing sections, such engagement taking place during the final stage in the folding swing of each section and being maintained in the folded position of the section. This engagement between wing and body sections produces a squeezing, gripping effect therebetween which prevents rattling in the structure.

The article being constructed principally of comparatively light sheet metal, it is desirable that the structure be in all respects adequately reinforced. I have provided means of reinforcement which not only strengthen certain structural parts, but which serve in other important capacities.

Guide rails 24, one for each side of each wing section, secured to the outer faces of the sides 11 of the body section A and curved arcuately from the axes of the hinge pins 20 as centers, reinforce said sides 11 of the body section. Shoes 25 secured to the inner faces of the sides 17 of the wing sections B, C cooperate with the guide rails 24, imparting strength to said sides 17 of the wing sections. The guide rails 24 occupy the spaces 22 between the sides 11 and 17 of the body and wing sections, each consisting of a strip of sheet metal curved edgewise and formed to provide offset flanges 26 and 27, the flange 26 being secured to a side 11 of the body section A, the other flange 27 occupying an outstanding position spaced slightly from said side. Each shoe 25 consists of a plate 28 having an offset lug 29, the plate being secured to a side 17 of a wing section with the lug 29 disposed inside of the outstanding flange 27 of its respective guide rail 24.

When the squeezing action occurs between the curved corner portions 23 of the wing sections B, C and the upper edges of the sides 11 of the body section A, there is a tendency of the free corners of the sides 17 of the wing sections to flare outwardly, such tendency to flare being overcome by reason of the engagement of the shoes 25 with the guide rails 24. And these shoes and guide rails maintain the relation between the sides 17 of the wing sections B, C and the sides 11 of the body section A in all of the various position occupied by the wing sections.

To limit the folding movements of the wing sections B, C and thus accurately retain the desired symmetrical appearance in the folded structure, I employ stops 30, consisting of lugs which are turned inwardly from the lower ends of the guide rails 25. The lugs 29 of the shoes 25 abut against these stops 30 in the fully folded positions of the wing sections, said sections being thus prevented from folding too far and giving the trunk the appearance of being "sway backed". Similar stops 31 inturned from the upper ends of the guide rails 24 form abutments for the lugs 29 of the shoes 25 and limit the unfolding movements of the wing sections B, C.

Means to prevent the wing sections B, C from bouncing with respect to the body section A in both the folded and unfolded positions of said sections, are incorporated in the guide rail and shoe construction, the flange 27 of each guide rail 24, near the upper end and also near the lower end thereof, being formed with an inwardly pressed hump 32, the lug 29 of the shoe 25 cooperating with said rail being correspondingly grooved, as at 33, to yieldingly receive the lower hump 32 in the fully folded position of the corresponding wing section and the upper hump 32 in the fully unfolded position of said section.

The edges 34 of the sides 17 of the wing sections B, C are inturned to form clips 35, wherein are gripped packing strips 36, which occupy positions within the spaces 22 between the sides 11 of the body section A and the sides 17 of the wing sections B, C. These packing strips 36 brush the sides 11 of the body section A as the wing sections B, C are folded and unfolded and, in the folded positions thereof, serve to exclude dust from the interior of the closed structure.

The wing sections B, C, when folded upon the body section A, marginally overlap at the center of the closed structure, the overlapping portions constituting ribs or beads 37, 38 which effectually reinforce the wing sections. These beads may consist of moldings riveted, welded or otherwise marginally secured to the sides 17 and walls 19 of the wing sections B, C or may comprise simply a doubling and suitable shaping of the marginal portions of said sides 17 and walls 19. The bead 37 on wing section B underlaps the bead 38 on wing section C, said bead 37 being shaped cross sectionally to provide a channel and bead 38 being shaped cross sectionally to provide an arched cap for the bead 37. Thus formed, the bead 38 strengthens the wing section C along its most vulnerable lines and dresses the closed structure, while the bead 37 similarly strengthens its respective wing section B and catches and drains away any rain or other water that may be driven under the covering bead 38.

Latching means supplementing the humped guide rails 24 and grooved shoes 25 are provided for positively locking the wing sections B, C in their fully unfolded or extended positions, said means further supplying a medium of relatively great strength supplementing the upper rail lugs 31 and the shoes 25 in limiting the unfolding movements of the wing sections. The reinforcing bar 16 at one side of the body section A is formed near either end thereof with a square aperture 39 (Fig. 7), the side 11 being correspondingly apertured to provide clear openings. Slidably guided in the apertures 39 of said bar 16 are studs 40, each being secured at its inner end to the face of a leaf spring 41 near one end thereof, the other end of the spring being riveted to the bar 16. These studs 40 are yieldingly pressed outwardly by said springs 41. In the folded positions of the wing sections B, C, and while they are being folded and unfolded, said studs 40 bear at their outer ends against the inner faces of the sides 17 of the wing sections B, C. The end portions of the beads 37, 38, at the side of the structure corresponding with the location of the studs 40, are formed with square apertures 42. As a wing section reaches its fully unfolded position or, in other words, as the shoes 25 of a wing section strike the upper lugs 31 of their respective guide rails 24, the latch stud 40 for that section is projected into the aperture 42 in its reinforcing bead, the contact of shoes 24 and lugs 31 preventing the swinging of the wing section beyond position in which the stud 40 can enter the aperture 42. Having been projected into the aperture 42 of the bead, the stud 40, held by the bar 16, prevents the breaking down of the unfolded wing section under loads that may be applied thereto. And too, the stud 40 positively prevents any upward bouncing movement of the wing section. The lugs 40 are preferably tapered, by reason of which construction they automatically compensate for any wear between the engaging parts and thus prevent rattling that otherwise might occur in long usage of the device. In order to facilitate the unlatching of the latch studs 40, the connection between the springs 41 and studs 40 are made so that the extreme ends of the springs extend sufficiently beyond the studs to provide finger holds, whereby the studs may be readily withdrawn from the apertures 42 in the beads 37, 38.

An exterior locking device is provided for tying the wing sections B, C together in the folded relation. The form of locking device shown consists of companion members, one constituting a bottom 43 which is secured to the wall 19 of wing section B and the other constituting a toggle link member 44 secured to the wall 19 of the wing section C. This type of locking device and its action being common and well known, it will be unnecessary to explain its construction in detail. Suffice it to say, that the link member 44 engages the bottom 43 and, following a short, strong pull, securely holds the two wing sections B, C against separation, as by any attempt to unfold either thereof. In this connection, it is to be noted that the shoes 25 of the wing sections B, C engage, respectively, their lower guide rail lugs 30 as the locking members 43 and 44 effect a lock between said w ng sections, whereby tension is imposed upon the parts to minimize rattling tendencies therein.

An alternate construction is shown in Figs. 11 and 12, there being in such form a reversal of parts, that is to say, a reversal of the guide rails 24 and shoes 25. In the structure as shown in these two views, the flanges 26 of the guide rails 24 are secured to the inner faces of the sides 17 of the wing sections B, C, while the shoes 25 are secured to the outer faces of the sides 11 of the body section A.

Changes in the specific form of my invention, as herein disclosed, may be made within the scope of what is claimed without departing from the spirit of my invention.

Having described my invention, what I claim as new and desire to protect by Letters Patent is:

1. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, the sides and said second wall of the wing section merging and forming curved corner portions adapted to engage and squeeze inwardly the sides of the body section at their upper edges, in the final folding stage of the wing section, guide rails, one for each side of each wing section, said rails being secured to the outer faces of the sides of the body section, each side of each wing section having a shoe secured to the inner face thereof and cooperating with its respective guide rail, said rails and shoes serving to prevent the outward flaring of the sides of the wing sections from the sides of the body section when and as the wing sections are folded on the body section.

2. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, the sides and said second wall of the wing section merging and forming curved corner portions adapted to engage and squeeze inwardly the sides of the body section at their upper edges, in the final folding stage of the wing section.

3. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, guide rails, one for each side of each wing section, said rails being secured to the outer faces of the sides of the body section, each side of each wing section having a shoe secured to the inner face thereof and cooperating with its respective guide rail.

4. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, guide rails, one for each side of each wing section, said rails being secured to the outer faces of the sides of the body section, each side of each wing section having a shoe secured to the inner face thereof and cooperating with its respective guide rail, each rail having a stop thereon, the shoe cooperating therewith, being adapted to engage said stop and limit the folding movement of its respective wing section.

5. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, guide rails, one for each side of each wing section, said rails being secured to the outer faces of the sides of the body section, each side of each wing section having a shoe secured to the inner face thereof and cooperating with its respective guide rail, each rail having a stop thereon, the shoe cooperating therewith, being adapted to engage said stop and limit the unfolding movement of its respective wing section.

6. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, guide rails, one for each side of each wing section, said rails being secured to the outer faces of the sides of the body section, each side of each wing section having a shoe secured to the inner face thereof and cooperating with its respective guide rail, each rail being formed with a stop at each end thereof, the shoe cooperating therewith being adapted to engage said stops and limit the folding and unfolding movements of its respective wing section.

7. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, guide rails, one for each side of each wing section, said rails being secured to the outer faces of the sides of the body section, each side of each wing section having a shoe secured to the inner face thereof and cooperating with its respective guide rail, one of the rails for each wing section and its companion shoe being formed with interengaging members for releasably securing the wing section with respect to the body section.

8. A convertible structure of the character described adapted to be closed in compact trunk-like form and expanded in the form of an open top carrier, said structure comprising a body section and wing sections foldable on the body section to envelope the same and unfoldable therefrom to provide extensions therefor, the body section consisting of a bottom and two sides, each wing section consisting of two sides and two walls, one wall thereof forming an end and the other a top portion of the structure, in the folded position of the section, the first wall forming a bottom portion of the structure and the second wall an end, in the unfolded position of the section, guide rails, one for each side of each wing section, said rails being secured to the outer faces of the sides of the body section, each side of each wing section having a shoe secured to the inner face thereof and cooperating with its respective guide rail, and packing strips secured to the sides of each wing section in brushing contact with the adjacent faces of the sides of the body section and providing dust excluding closures between the body and wing sections in the folded positions of the latter.

9. An article of the character described including a body section and a closure section movable with respect thereto and adapted in one relative position to form in connection therewith a closed container and in another relative position an open container, the two sections having sides, a side of one lapping a side of the other, means associated with said lapping sides providing a sliding connecton therebetween, said means including a guide rail on one of the sides and a shoe on the other side cooperating with said rail, said rail serving to reinforce its respective side and, further, serving through said shoe to strengthen said other side engaging means on said shoe, and complementing engaging means at one end of the rail, said means cooperating to releasably secure the shoe and rail against relative movement and thus similarly secure the closure section in one extreme position with respect to said body section.

10. A combined trunk and luggage carrier for automobiles, including a body section consisting of a bottom and two sides and, further including wing sections hinged to the opposite ends of the body section and foldable thereon, each wing section consisting of two sides and two walls and in their unfolded positions forming together with the body section an elongated carrier open at its top, and in their folded positions forming together with said body section a closed trunk, the sides of the wing sections being in substantial continuation of the sides of the body section in the first form and being lapped with respect thereto in the second form, the adjacent sides of said sections being slidably connected by means including a guide rail secured to one side and a shoe cooperating with said rail and secured to the other side.

11. A combined trunk and luggage carrier for automobiles, including a body section consisting of a bottom and two sides and, further, including wing sections hinged to the opposite ends of the body section and foldable thereon, each wing section consisting of two sides and two walls and in their unfolded positions forming together with the body section an elongated carrier open at its top, said wing sections in their folded position enveloping the body section and together therewith forming a closed trunk, the sides of the wing sections being in substantial continuation of the sides of the body section in the first form and being lapped with respect thereto in the second form, the two wing sections in such second form being marginally lapped each along the two sides and one wall thereof, the lapping portions of the wing sections consisting of reinforcing beads, the underlapping bead of the one wing section forming a gutter and the overlapping bead of the other wing section forming a cap for the gutter, the two beads providing a drainage trap for excluding moisture from the interior of the trunk.

12. In an article of the character described, a body section open at top and ends, wing sections hinged to lower end portions of body section and providing marginally lapping hoods enveloping the body section and together therewith forming a closed trunk in their folded positions and, in their unfolded positions providing together with said body section an open top carrier, the marginally lapping portions of said wing sections embodying beads for reinforcing the wing sections, and said beads providing a drainage trap for excluding moisture from the interior of the trunk.

13. A combined trunk and luggage carrier for automobiles, including a body section consisting of a bottom and two sides and, further including wing sections hinged to the opposite ends of the body section and foldable thereon, each wing section consisting of two sides and two walls and in their unfolded positions forming together with the body section an elongated carrier open at its top, said wing sections in their folded position enveloping the body section and together therewith forming a closed trunk, the sides of the wing sections being in substantial continuation of the sides of the body section in the first form and being lapped with respect thereto in the second form, latches, one for each wing section, each latch being adapted automatically to secure its respective wing section in unfolded position and comprising a spring leaf secured at one end to the inner face of a side of the body section, said side having an aperture therein, a stud positioned within the aperture and secured to the free end of the spring leaf, said stud being pressed outwardly by said leaf, through said aperture, against the adjacent lapping side of its respective wing section, in the folded position thereof and further outwardly into the path of an edge of said section in its unfolded position.

14. A combined trunk and luggage carrier for automobiles, including a body section consisting of a bottom and two sides and, further including wing sections hinged to the opposite ends of the body section and foldable thereon, each wing section consisting of two sides and two walls and in their unfolded positions forming together with the body section an elongated carrier open at its top, said wing sections in their folded position enveloping the body section and together therewith forming a closed trunk, the sides of the wing sections being in substantial continuation of the sides of the body section in the first form and being lapped with respect thereto in the second form, latches, one for each wing section, each latch being adapted automatically to secure its respective wing section in unfolded position and including a spring pressed stud, a side of the body being apertured to receive and slidably guide the stud into position into the path of an edge of the adjacent side of the unfolded wing section.

15. A combined trunk and luggage carrier for automobiles, including a body section consisting of a bottom and two sides and, further, including wing sections hinged to the opposite ends of the body section and foldable thereon, each wing section consisting of two sides and two walls and in their unfolded positions forming together with the body section an elongated carrier open at its top, said wing sections in their folded positions enveloping the body section and together therewith forming a closed trunk, the sides of the wing sections being in substantial continuation of the sides of the body section in the first form and being lapped with respect thereto in the second form, the two wing sections in such second form being marginally lapped, each along the two sides and one wall thereof, the lapping portions of the wing sections embodying reinforcing beads, a reinforcing band secured to one of the walls of the body section along the upper edge thereof, said beads and bands being formed with apertures therein registering in the unfolded positions of the wing sections, latches, one for each wing section, each latch being adapted to secure its respective wing section in unfolded position and including a spring pressed stud slidably guided in an aperture of said band and adapted to project into the registering aperture in the bead of its respective wing section in the unfolded position thereof.

16. A combined trunk and luggage carrier for automobiles, including a body section consisting of a bottom and two sides and, further, including wing sections hinged to the opposite ends of the body section and foldable thereon, each wing section consisting of two sides and two walls and in their unfolded positions forming together with the body section an elongated carrier open at its top, said wing sections in their folded position enveloping the body section and together therewith forming a closed trunk, the sides of the wing sections being in substantial continuation of the sides of the body section in the first form and being lapped with respect thereto in the second form, the two wing sections in such second form being marginally lapped, each along the two sides and one wall thereof, the lapping portions of the wing sections embodying reinforcing beads, a reinforcing band secured to one of the walls of the body section along the upper edge thereof, said beads and bands being formed with apertures therein registering in the unfolded positions of the wing sections, latches, one for each wing section, each latch being adapted to secure its respective wing section in unfolded position and including a spring pressed stud slidably guided in an aperture of said band and adapted to project into the registering aperture in the bead of its respective wing section in the unfolded position thereof, said studs being tapered to take up wear.

17. In an article of the character described, a body section comprising a bottom and sides, the same being open at top and ends, a reinforcing member applied to one of said sides at the upper margin thereof, wing sections hinged to lower end portions of body section and providing marginally lapping hoods enveloping the body section and together therewith forming a closed trunk in their folded positions and, in their unfolded positions, providing together with said body section an open top carrier, the marginally lapping portions of said wing sections embodying reinforcing beads, and latching means carried by said reinforcing member adapted to engage the beads of the wing sections in the unfolded positions thereof.

18. In an article of the character described, a body section comprising a bottom and sides, the same being open at top and ends, wing sections hinged to the lower end portions of the body section and providing marginally lapping hoods enveloping the body section and together therewith forming a closed trunk in their folded positions and, in their unfolded positions, providing together with said body section an open top carrier, the marginally lapping portions of said wing sections embodying reinforcing beads, a latching device for each wing section, each device being carried by a side of the body section and adapted to engage the bead of its respective wing section in the unfolded position thereof.

19. A combined trunk and luggage carrier for automobiles, including a body section consisting of a bottom and two sides and, further, including a wing section hinged to one end of the body section and foldable thereon, said wing section consisting of two sides and two walls and in its unfolded position forming an open top continuation of the body section, said wing section in its folded position closing the adjacent end and top of the body section, the sides of the wing section being in substantial continuation of the sides of the body section in the unfolded position of the wing section and being lapped with respect thereto in the folded position of said wing section, the sides of said body and wing sections being formed and relatively disposed to yieldingly engage and squeeze against each other in the final stage of the folding of the wing section on the body section to prevent the rattling of one section against the other.

20. In an article of the character described, a body section open at top and ends, wing sections hinged to the lower end portions of the body section and providing marginally lapping hoods enveloping the body section and together therewith forming a closed trunk in their folded positions and, in their unfolded positions providing together with said body section an open top carrier, the overlapped wing section embodying a drainage bead at its overlapped portion for catching and excluding moisture from the interior of the trunk and also for reinforcing the said overlapped wing section.

In testimony whereof I affix my signature.

JOHN W. MALMQUIST.